United States Patent [19]

Hall et al.

[11] Patent Number: 4,550,922
[45] Date of Patent: Nov. 5, 1985

[54] WORKHOLDER

[75] Inventors: William E. Hall, Solon; Edward D. Gailey, Mentor; George J. Ovanin, Euclid, all of Ohio

[73] Assignee: The S-P Manufacturing Corporation, Cleveland, Ohio

[21] Appl. No.: 410,258

[22] Filed: Aug. 23, 1982

[51] Int. Cl.⁴ .............................................. B23B 31/12
[52] U.S. Cl. ................. 279/119; 279/1 ME; 279/110
[58] Field of Search ............ 279/1 R, 1 C, 1 B, 119, 279/110, 123, 1 ME, 118

[56] References Cited

U.S. PATENT DOCUMENTS

| 2,867,443 | 1/1959 | Swanson | 279/119 |
| 3,278,194 | 11/1966 | Sampson | 279/119 |
| 3,744,808 | 7/1973 | Hughes | 279/119 X |
| 3,858,893 | 1/1975 | Ovanin | 279/119 X |
| 3,984,114 | 10/1976 | Ovanin | 279/119 |
| 4,200,300 | 4/1980 | Röhm | 279/1 C |
| 4,321,845 | 3/1982 | Szabo et al. | 279/119 X |

OTHER PUBLICATIONS

Catalog entitled "The Centrifu-grip chuck", catalog 126 B, SP Mfg. Co., 1982.

Primary Examiner—William R. Briggs
Attorney, Agent, or Firm—Watts, Hoffmann, Fisher & Heinke

[57] ABSTRACT

A workholder for a machine tool or the like having a power assembly and a work gripping assembly that are separable to permit use of a plurality of work gripping assemblies and associated work gripping jaws of a size and shape to accommodate different workpieces. Work gripping assemblies with jaws pre-qualified to different workpieces can be exchanged quickly and automatically, as by use of a robot, when different parts are to be machined, while a single power assembly remains connected to the machine tool.

15 Claims, 11 Drawing Figures

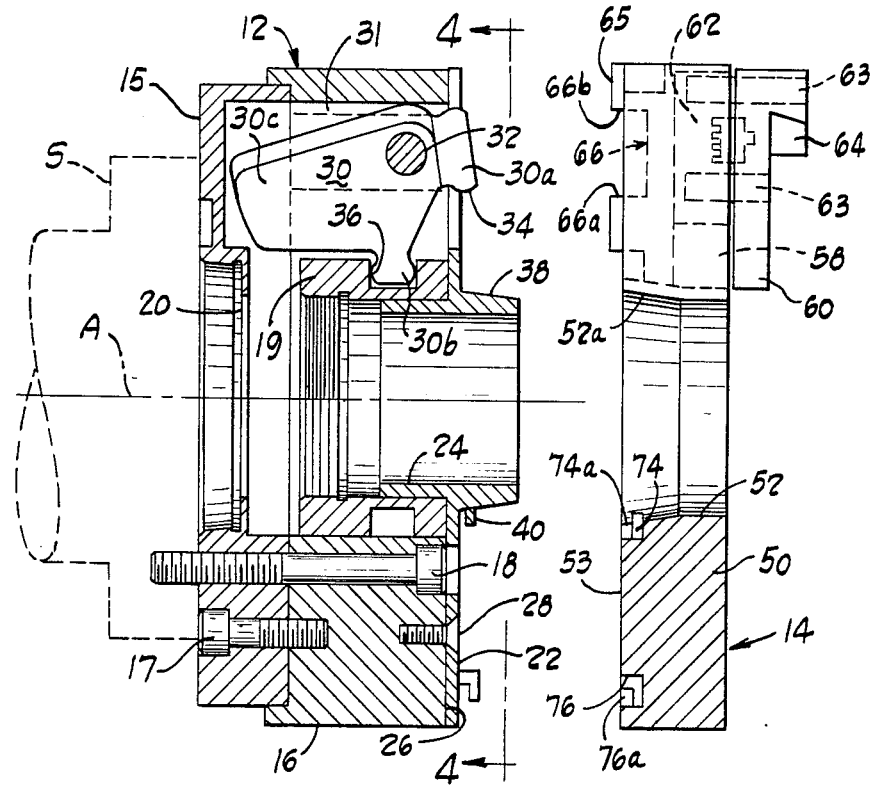
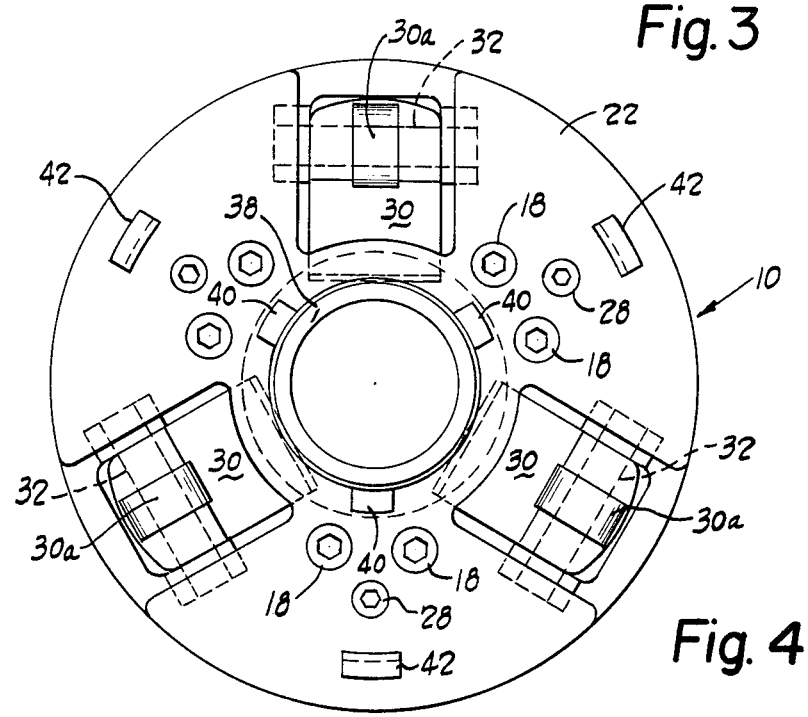
Fig. 3
Fig. 4

WORKHOLDER

DESCRIPTION

1. Technical Field

This invention relates to workholders and especially to rotary workholders for machine tools. The invention facilitates automatic and/or rapid change of work grippers for holding work pieces of different gripped size or contour.

2. Background Art

Technical changes in the machine tool industry have facilitated automatic machining of parts, as by the use of numerically controlled machines, flexible machining centers, and the like, and the use of robots for loading and unloading parts to and from machine tools.

Typically, a workpiece is held in a rotary workholder, such as a jaw chuck, in which work gripping jaws (so-called "top jaws") are often performed to the contour of the surface of the part to be gripped. The parts can be automatically fed to the work gripping jaws, but where the part is changed so that the portion gripped is of a different size or shape than before, new top jaws are required. These are usually machined to the desired shape and size, often on the machine tool itself. Machining the top jaws or changing the jaws are both time consuming and neither operation lends itself to automation. For example, even the changing of work gripping or so-called "top jaws" carried on master jaw slides of a chuck requires the removal of several fasteners, the proper locating of the top jaw and then securing the jaw in place. Often the work gripping surface of this jaw is then machined to conform to a workpiece.

From the above it will be apparent that a need exists to permit converting a workholder adapted to grip a part of given size and dimension to a configuration in which a part of different size and/or configuration can be gripped without changing the chuck on the machine tool, which requires disconnection of power actuators, interconnections, and the like, and without the time consuming operations of removing threaded fasteners and adjusting top jaws, which preclude automation. It will be appreciated that changes of a chuck or changes of a top jaw are complex in that they involve multiple steps and some adjustments that require sensing and feedback, which under the present state of the art, requires human operator intervention and is beyond the ability of robot operation.

DISCLOSURE OF THE INVENTION

The present invention ovecomes the above problems presented by the use of conventional chucks or other workholders by providing a workholder or chuck of two separable assemblies, a power assembly and a work gripping assembly, each performing only part of the functions accomplished by the entire workholder. To this end, the first power assembly is constructed to be secured to a workholder support, such as a rotary spindle of a machine tool, in a conventional way and is intended to remain secured to the spindle during machining of a variety of parts of different sizes and/or dimensions where gripped. The power assembly includes a body and actuator-powered force transmitters, such as levers pivoted in the body, with force transmitting surfaces adapted to engage one or more work gripping members, such as work gripping jaws, and to exert force in a direction transverse to an imaginary line through the body, for example, in a direction radially of the rotary axis of a machine tool spindle to which the workholder is attached. Thus, the power assembly performs the functions of transmitting, amplifying, translating and splitting the force from an actuator, such as a draw tube or the like. The work gripping assembly includes a body and work grippers supported and guided by the body for movement transversely of an imaginary line through the body, for example, transversely of the rotary axis of the spindle to which the assembly is attached. It performs the functions of holding the workpiece or part and locating it both axially and radially relative to the center line or rotary axis of the spindle. The work grippers have surfaces engageable with the force transmitters of the power assembly when the work gripping assembly is secured to the power assembly, in axial alignment; for example, with the two assemblies arranged in tandem, face to face, coaxially with the spindle axis.

The power assembly and work gripping assembly are interconnected with a quick connect/disconnect fitting or fittings, such as fittings of the pin and detent type or bayonet type, and preferably with a tapered pilot or the like providing mating locating surfaces. This type of interconnection requires only simple and short relative motion, preferably short axial relative motion or axial and rotary relative motion, to connect or disconnect the two assemblies.

With the above described arrangement, two or more work gripping assemblies can be prequalified at a remote site; that is, the work gripping surfaces of each work gripping assembly can be contoured to cooperate with workpieces of different sizes and/or gripped contours; and then be located in positions relative to the machine tool where a robot or automatic handling mechanism can automatically exchange one work holding assembly with another on the power assembly, quickly and automatically, when different parts are to be machined. This arrangement eliminates the use of machine tool time to bore the jaws to facilitate a change in workpiece or to change the jaws, or to change the chuck.

The above and other features and advantages will become better understood from the detailed description that follows, when considered in connected with the accompanying drawings.

BRIEF DESCRIPTION OF DRAWINGS

FIG. 3 is a transverse sectional view similar to that of FIG. 2, but with the power assembly and work gripping assembly separated;

FIG. 4 is a front elevational view of the power assembly shown in FIG. 3, taken along the line 4—4;

BEST MODE FOR CARRYING OUT THE INVENTION

Figure 1:
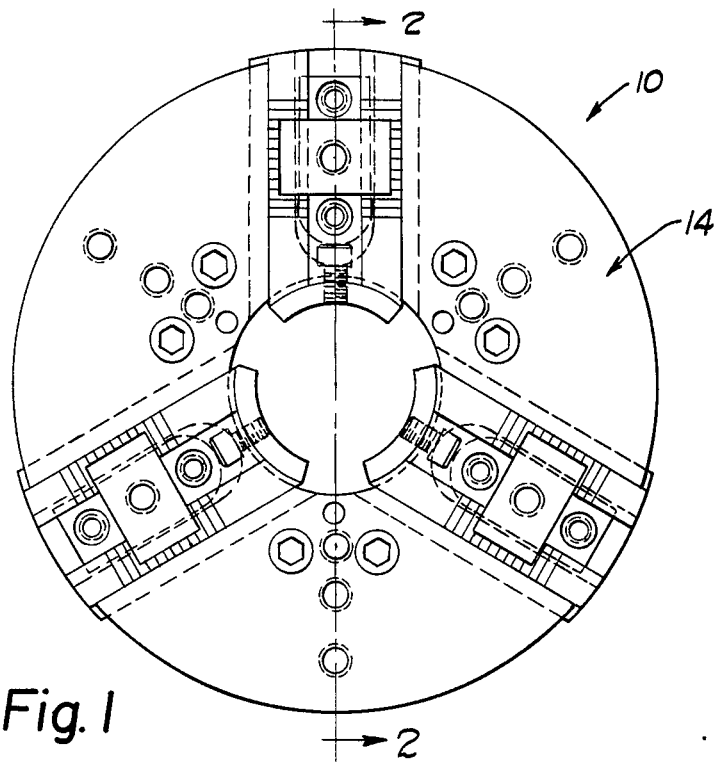
FIG. 1 is a front elevational view of a workholder embodying the present invention.
Figure 2:
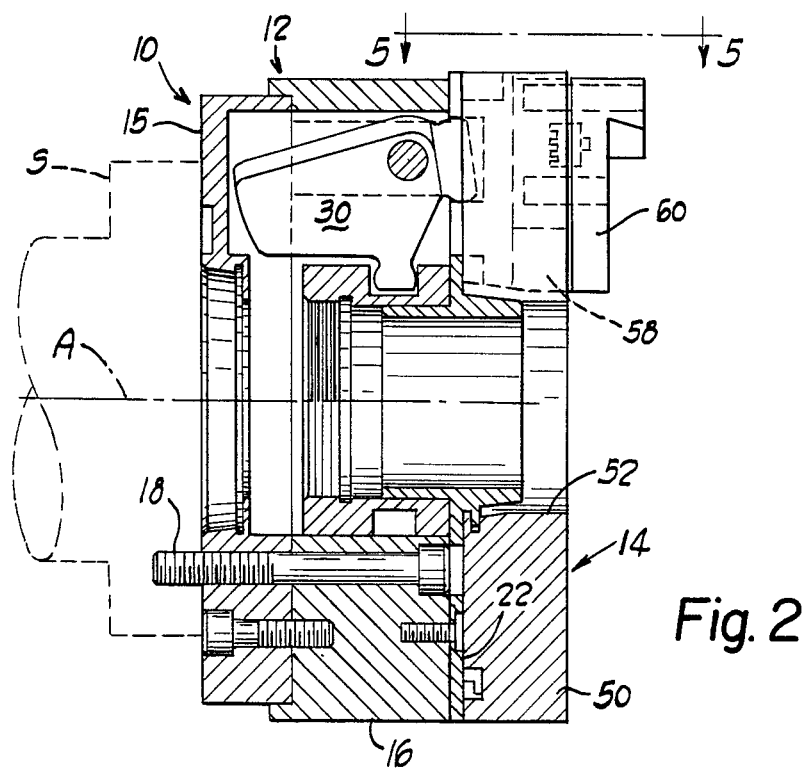
FIG. 2 is a transverse sectional view of the workholder of FIG. 1, taken along the line 2—2.

A workholder 10 embodying the present invention is shown in the drawings, comprised of two separable assemblies, a power assembly 12 and a work gripping assembly 14. The assemblies are shown secured together in FIGS. 1 and 2, and are separated in FIG. 3. The power assembly 12 has a back plate 15 and a cylindrical body 16 fastened together by screws 17. The body is secured to the nose of a spindle S by mounting screws 18 in a conventional way, coaxial with a rotary axis A of the spindle. A central actuating collar 19 is supported within the body 16 for reciprocation along the axis A and is in use connected to a draw tube (not shown) that extends through the spindle S and into the body through a central opening 20 in the back plate 15. The collar slides on a guide bushing portion 24 of a face plate 22 secured to the front face 26 of the body 16 by screws 28.

Three bell crank levers 30, equally spaced 120° about the axis A, within three cavities 31 of the body, are pivoted on shafts 32 that extend transversely to the axis A. A short arm 30a of each lever extends through or beyond the front face 26 and has a force transmitting surface 34. A long arm portion 30b of each lever is engaged in a peripheral groove 36 of the collar 19 and serves to rock the lever about the axis of the shaft 32 when the collar is reciprocated. A counterweight portion 30c of each lever extends in an opposite direction from the arm 30a. The collar and lever construction are substantially as shown in U.S. Pat. No. 3,984,114, the disclosure of which is incorporated herein by reference.

The face plate 22 has a central frusto conical, i.e., tapered, cylindrical boss portion 38 extending beyond the plate, outwardly of the body, and has three bayonet fingers 40 extending radially from the boss, spaced from the face plate, and located in the space between the levers (as best shown in FIG. 4.) Three additional bayonet-type fingers 42 are located radially outward of the fingers 40 and the fingers 40, 42 cooperate with the work gripping assembly 14.

Figure 5:
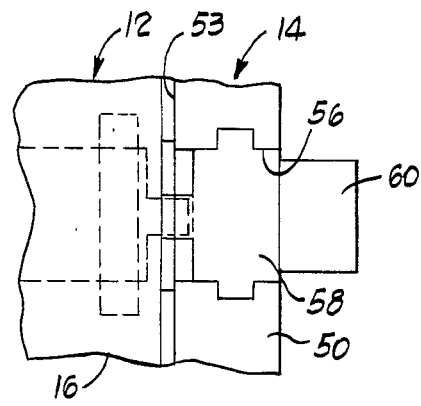
FIG. 5 is a partial top plan view of the workholder taken along the line 5—5 of FIG. 1.

The work gripping assembly 14 is comprised of a circular plate 50 with a central opening 52 having a tapered portion 52a at a backface 53, to receive the pilot boss 38. The plate has three radial channels 56 (FIG. 5) with guideways in which master jaws 58 slide radially. Work gripping jaws or so-called "top jaws" 60 are secured to the master jaws in a known manner, as by jaw nuts 62 and machine screws 63, and in the embodiment shown carry a hard serrated insert 64. Alternatively, soft top jaws may be used, and machined to a desired shape, the choice of top jaw being dependent upon the nature of the workpiece being gripped.

Each master jaw 58 has a back portion 65 that extends beyond the back face 53 of the circular plate 50. A recess 66 is formed in the back portion 65 to receive the force transmitting portion of the lever arm 30a, which acts against a surface 66a to move the master jaw radially toward the central axis A to grip a workpiece and center it with respect to the axis A, and acts against the surface 66b to move the jaw away from the axis to release a workpiece.

Figure 6:
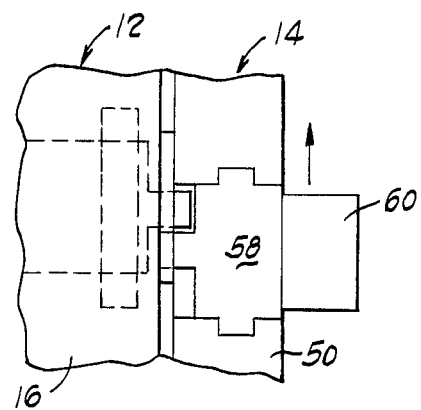
FIG. 6 is a view similar to that of FIG. 5 showing the assemblies slightly rotated relative to each other.
Figure 7:
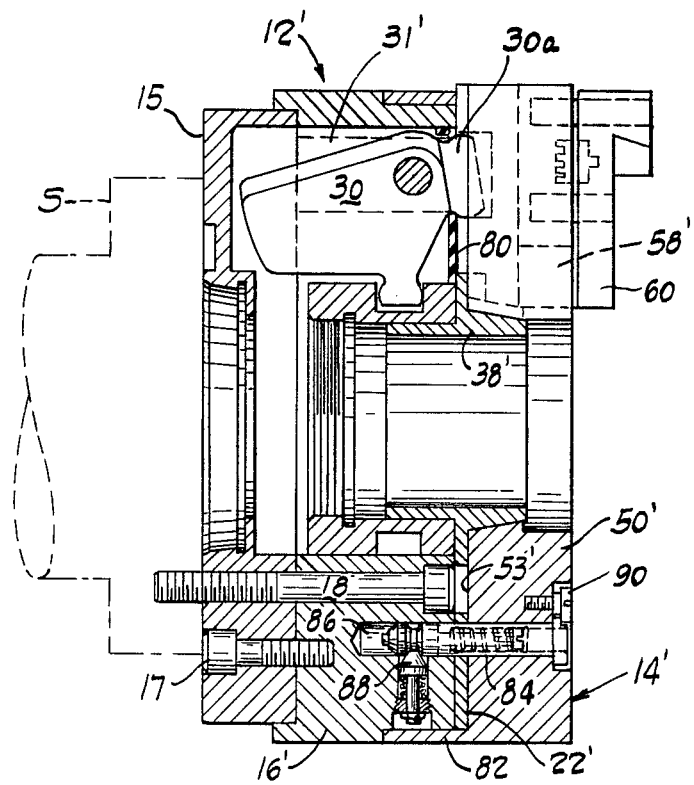
FIG. 7 is a transverse sectional view similar to FIG. 2 but illustrating another embodiment.
Figure 8:
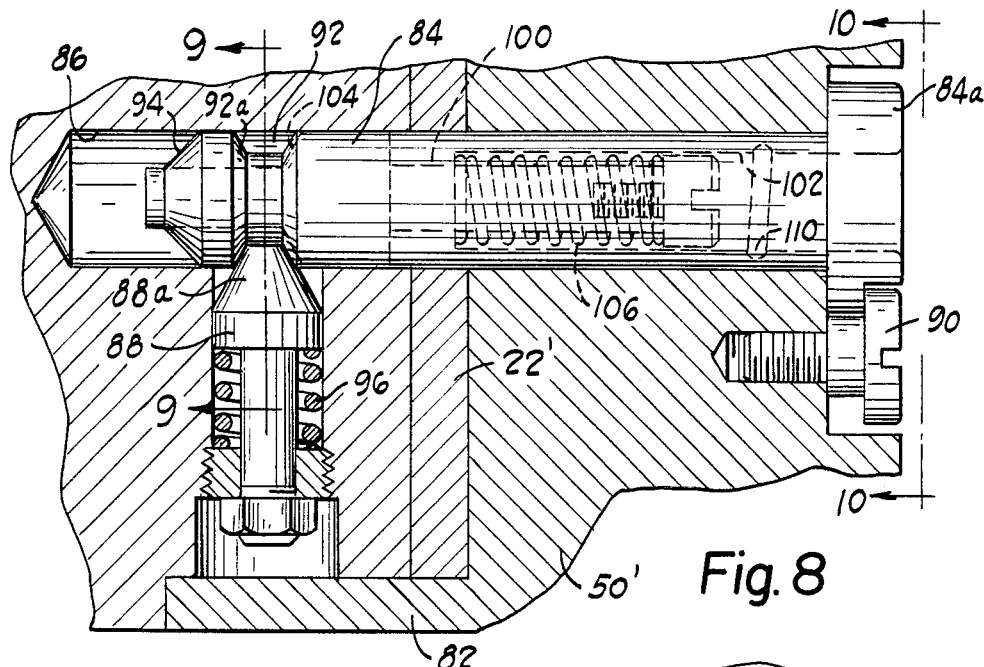
FIG. 8 is an enlarged fragmentary view partly in section and partly in elevation showing details of the structure at the lower right-hand corner of FIG. 7.
Figure 9:
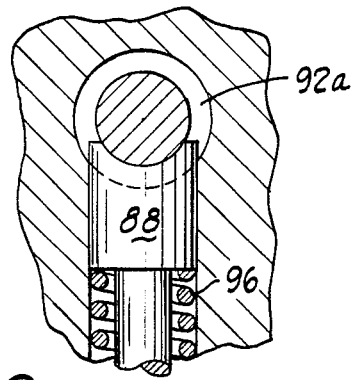
FIG. 9 is a view taken along the line 9—9 of FIG. 8.
Figure 10:
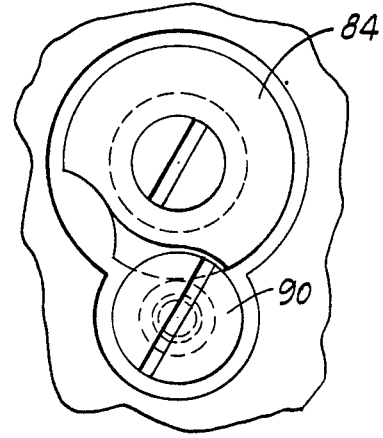
FIG. 10 is a partial front elevational view taken from the plane of line 10—10 of FIG. 8.
Figure 11:
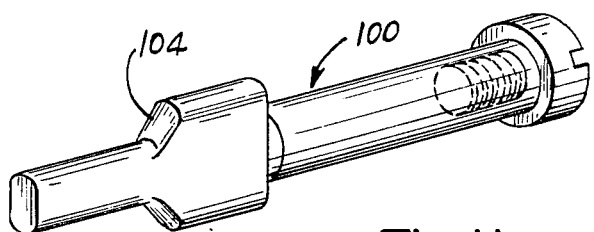
FIG. 11 is a perspective view of a part of the mechanism shown in FIG. 8.

The width of the lever arm 30a in the peripheral direction and the width of the back portion 65 of the master jaw, which extends beyond the back face 53, are narrow relative to the width of the cavity in which the lever is supported and relative to the remainder of the lever width, so the projecting back portion 65 can be received in the cavity 31 beside the short lever arm 30a, as shown in FIG. 6, when the workholder assembly is moved axially from the separated position of FIG. 3 into contact with the face plate 22. Slight relative rotation between the workholder assembly and the power assembly will then move the short lever arm 30a and the master jaw into radial alignment where the lever will cooperate with the surfaces 66a, 66b of the master jaw to move the jaw radially when the lever pivots.

As shown in FIGS. 3 and 4, the three bayonet-type fingers 40, 42 are constructed in the nature of thread segments, i.e., with a slight pitch, and project from the pilot surface and from the front face of the plate. Cavities 74, 76 in the back surface 53 of the circular plate 50 include open portions to receive the fingers axially and have retaining surfaces 74a, 76a with a slight pitch to cooperate with the fingers when the two assemblies are relatively rotated and to thereby secure the two in tight relationship. The direction of rotation is selected to assure that rotation of the workholder in use tends to tighten the two parts together.

In use, the power assembly 12 is secured to the spindle S of a machine tool. Two or more work gripping assemblies 14 are provided with appropriate top jaws for workpieces having a different contour where gripped. Initially, one of the work gripping assemblies is attached to the power assembly by bringing it axially into contact with the face plate 22, during which motion the pilot surface centers the work gripping assembly and the bayonet-like fingers 40, 42 are received in their respective recesses or cavities 74, 76. The work gripping assembly is then rotated slightly relative to the power assembly, or vice versa, to tightly secure the two together. A workpiece can then be positioned between the jaws, the actuaing collar moved axially to pivot the levers 30, moving the jaws together, to firmly grip and center the workpiece, after which the spindle and workholder 10 are rotated to machine the workpiece. When it is desired to change the operation of the machine tool for machining a workpiece of different dimension or different contour at the gripped portion, the work gripping assembly is rotated in the opposite direction relative to the power assembly and moved axially away therefrom and a second work gripping assembly with different top jaws compatible with the new workpiece is attached to the power assembly in the same manner as already described. At that time the machine tool is again ready to grip a workpiece, but of different contour or size, with little loss of machining time. It will be appreciated that the work gripping assemblies can be located and arranged to be handled automatically, as by a suitable robot or other automatic handling machinery, because the manipulation required is relatively simple and direct, and does not require complex feedback control to accomplish.

Another embodiment of the invention of more rugged construction is shown in FIGS. 7–11 of the drawings in which identical parts will be identified with the same reference numerals as in FIGS. 1–6, and similar parts will be identified with the same reference numeral with a prime mark affixed. In this embodiment, a flexible rubber seal 80 suitably attached to the body closes the front of the lever cavities 31' to prevent entry of chips or the like when a work holding assembly is changed. While permitting the lever arm 30a to extend and move radially; a rearwardly extending flange or skirt portion 82 of the circular plate 50' overlaps the periphery of the body 16' to provide increased rigidity to the work holding assembly against distorting forces experienced during work gripping and machinery; and connecting pins 84 are provided on the work gripping assembly to be received in apertures 86 of the power assembly and retained by detents 88 to permit interlocking of the parts 14' and 16' through only relative axial movement and to positively prevent relative radial movement in either direction about the spindle axis, so there is no chance of loosening the two assemblies during a fast spindle stop or reverse rotation. Three pins 84 are provided in the preferred embodiment, each to be closely received within one of three apertures 86 peripherally spaced equidistant from one another, each located in the solid chuck body portion between adjacent jaw cavities. Each pin 84 is received with a slip fit in the plate 50' and secured by a head 84a and a shoulder screw 90 that retains the pin and locates it in a predetermined orientation. The end of each pin 84 extending from the back face 53' has a circumferential groove 92 (FIG. 8) and a leading tapered camming surface 94 that cooperates with the end of the detent 88 within the body 16'. The detent is movable into and out of the aperture 86 and is biased into the aperture by a spring 96. A tapered end 88a of the detent is cammed out of the aperture by the surface 94 of the pin when the pin is moved into the aperture, and is then moved back into the aperture and into the groove 92 of the pin by the spring. The inclined surface 92a of the groove assures that the pin will retain the face 53 flush against the power assembly, yet is steep enough to prevent camming the detent outward by any expected axial force that might tend to separate the assemblies. An unlocking plunger 100 (FIGS. 8 and 11) is carried by each pin, sliding axially in a central bore 102. Each plunger has a tapered camming surface 104 that moves in an axial slot in the end of its respective pin. It is held in a retracted position by a spring 106, clear of the peripheral groove 92. When pushed by an external male actuator moved axially into the central bore 102 of the pin from the front face of the plate 50', the tapered camming surface 104 will force the detent 88 from the peripheral groove to allow removal of the work holding assembly from the power assembly. Removal of the work gripping assembly 14' is facilitated by a circumferential groove 110 in the bore 108 of each pin 84. The associated male actuator in the form of a dowel or rod (not shown) can be provided with spring biased ball detents that snap into the groove 110 when the actuator has moved the plunger 100 a sufficient distance to cam the detent 88 from the groove 92. Movement of the dowel or rod in the opposite direction, as to withdraw it, instead carries the work holding assembly away from the power assembly by the gripping action of the ball detents to separate the two. The male actuator can be robot controlled. Both assembly and disassembly require only movements in an axial direction, which can be simply controlled and performed. A close fit between the pins 84 and the apertures 86 prevents relative rotation of the two assemblies in either direction. Because only axial movement is required, the interengaging surfaces of the actuating lever arms 30a and the master jaws 58 can be the full width of the cavities 31' for greater strength, as compared with the construction shown in FIGS. 1–6.

While a preferred embodiment of the invention has beend described in detail, it will be appreciated that various modifications and alterations may be made therein without departing from the spirit and scope of the invention set forth in the appended claims.

We claim:

1. A power operated workholder assembly comprising a power subassembly and a workholding subassembly separable to permit removal of the workholding subassembly as a unit from the power subassembly without disassembly of either; the power subassembly comprising a first body and power actuable means movable relative to said first body for exerting a force when actuated; the workholding subassembly comprising a second body and work gripping means carried by the second body movable relative to the second body; said power-actuable means and said work gripping means being releasably interengaged to transmit force between the two and disengageable through relative movement of the first and second bodies to allow separation; and means integral with each body to separably retain the first and second bodies tightly together in response to relative movement of the two bodies.

2. The workholder assembly of claim 1 wherein the assembly has a central rotary axis and the work gripping means is movable transversely of the rotary axis.

3. The workholder assembly of claim 2 wherein the power subassembly includes at least one lever pivotably supported by said first body for movement about an axis transverse to said rotary axis and reciprocable means for pivoting said lever.

4. The workholder assembly of claim 3 wherein the lever includes an arm that extends beyond the first body in the direction of said rotary axis.

5. The workholder assembly of claim 1 wherein said work gripping means includes means to guide movement of the work gripping means in a predetermined path relative to the second body and a slide movable in said second body along said guide means.

6. The workholder of claim 5 wherein said slide includes a surface in contact with said power actuable means.

7. The workholder of claim 1, 2, 3, 4, 5 or 6 wherein said means to retain the bodies together includes surfaces that coact through axial relative movement and relative rotary movement of fewer than 360° between the two bodies.

8. The workholder of claim 1, 2, 3, 4, 5 or 6 wherein said means to retain the bodies together includes surfaces that interengage with only relative axial movement of the first and second bodies and that once interengaged positively restrain relative axial movement and relative rotary movement between the two bodies.

9. A method of changing a work gripping device capable of gripping a workpiece with radial force comprising the steps of
providing a power subassembly with a first body, power actuable means movable relative to the first body, and means on the first body to connect it to a second body of a workholding subassembly in response to relative movement between said two bodies,
providing at least two separate workholding subassemblies each including a second body, work gripping means carried by the second body for movement relative thereto by said power actuable means when the second body is connected to the first, and means on each of the second bodies to separately connect the second bodies to the first body in response to relative movement between the first and second bodies, providing the work gripping means of each workholding subassembly with a different contour, and connecting first one of said work gripping subassemblies as a unit to the power subassembly as a result of relative movement of the first and second bodies and subsequently removing the one and connecting the other and gripping a workpiece of different contour with each of the two work gripping subassemblies.

10. The method of claim 9 including the step of rotating the connected subassemblies and machining a workpiece held by the work gripping means.

11. A workpiece holding system for a rotary machine tool providing work grippers of different contour for use with a common power source, said system comprising:

a rotary power assembly including a first body and power actuable means movable relative to the first body for exerting force radially of the axis of rotation of said power assembly, a first work gripping assembly including a second body and work gripping means supported and guided by said second body for movement radial of said axis, said first work gripping assembly being separate from said power assembly and including means for connecting the second body to the first with the power actuable means coacting with the work gripping means to move the work gripping means radially of said axis, a second work gripping assembly including a third body and work gripping means supported and guided by said third body for movement radial of said axis, said second work gripping assembly being separate from said power assembly and including means for connecting the third body to the first with the power actuable means coacting with the work gripping means to move the work gripping means radially of the said axis, the work gripping means of said first work gripping assembly being contoured differently from the work gripping means of said second work gripping assembly, and means on said power assembly for coacting with the means on the first and second work gripping assemblies that connect the second and third bodies to the first to interconnect the power assembly with either of the first and second assemblies in response to relative movement between the first body and the second and third bodies.

12. The system of claim 11 wherein said means to interconnect the power assembly with either of the first and second assemblies includes structures that interengage through relative axial motion.

13. The system of claim 11 or 12 wherein said means to interconnect the power assembly with either of the first and second assemblies includes structures that interengage through relative rotary motion of less than a complete revolution.

14. The workholder assembly of claim 1, 2, 3, 4, 5, 6, 11 or 12 wherein one of said first and second bodies has a tapered pilot member that guides and locates the other of said first and second bodies during relative movement therebetween.

15. The workholder assembly of claim 1, 2, 3, 4, 5 or 6 wherein said means to retain the bodies together includes a spring biased detent in one of said bodies and a member retainable thereby extending from the other of said bodies.

* * * * *